US010263952B2

United States Patent
Yoakum et al.

(10) Patent No.: US 10,263,952 B2
(45) Date of Patent: Apr. 16, 2019

(54) PROVIDING ORIGIN INSIGHT FOR WEB APPLICATIONS VIA SESSION TRAVERSAL UTILITIES FOR NETWORK ADDRESS TRANSLATION (STUN) MESSAGES, AND RELATED METHODS, SYSTEMS, AND COMPUTER-READABLE MEDIA

(71) Applicant: Avaya Inc., Basking Ridge, NJ (US)

(72) Inventors: John H. Yoakum, Cary, NC (US); Kundan Singh, San Francisco, CA (US); Alan B. Johnston, St. Louis, MO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/068,839

(22) Filed: Oct. 31, 2013

(65) Prior Publication Data

US 2015/0120879 A1    Apr. 30, 2015

(51) Int. Cl.
 *G06F 15/16*   (2006.01)
 *H04L 29/12*   (2006.01)
 (Continued)

(52) U.S. Cl.
 CPC .... *H04L 61/2575* (2013.01); *G06F 17/30861* (2013.01); *H04L 61/2589* (2013.01);
 (Continued)

(58) Field of Classification Search
 CPC .............................. G06F 15/16; G06F 16/177
 (Continued)

(56) References Cited

U.S. PATENT DOCUMENTS 6,714,967 B1   3/2004 Horvitz
7,107,316 B2   9/2006 Brown et al.
(Continued)

FOREIGN PATENT DOCUMENTS

EP   1615386 A1   1/2006
EP   2529316 A2   12/2012
(Continued)

OTHER PUBLICATIONS

Andreasen et al., "Session Description Protocol (SDP): Security Descriptions for Media Streams," Network Working Group, Request for Comments: 4568, Standards Track, The Internet Society, Jul. 2006, 40 pages.
(Continued)

*Primary Examiner* — Vivek Srivastava
*Assistant Examiner* — Sibte H Bukhari
(74) *Attorney, Agent, or Firm* — Sheridan Ross P.C.

(57) ABSTRACT

Providing origin insight via Session Traversal Utilities for Network Address Translation (STUN) messages for web applications, and related methods, systems, and computer-readable media are disclosed herein. In one embodiment, a method for providing origin insight for web applications via STUN messages comprises determining an origin identifier for a web application attempting to send a STUN message to a STUN server; generating the STUN message incorporating the origin identifier for the web application; and transmitting the STUN message to the STUN server. In another embodiment, a method for providing STUN services to web applications comprises receiving a STUN message from a web client, and extracting an origin identifier for a web application. Provision of a STUN service to the web application is determined based on the origin identifier. If the STUN service should not be provided, the STUN message
(Continued)

is rejected or disregarded; otherwise the STUN message is processed.

14 Claims, 4 Drawing Sheets

(51) Int. Cl.
    *G06F 17/30*     (2006.01)
    *H04L 29/06*     (2006.01)
    *H04L 29/08*     (2006.01)

(52) U.S. Cl.
    CPC ........ *H04L 61/2514* (2013.01); *H04L 65/608* (2013.01); *H04L 67/02* (2013.01)

(58) Field of Classification Search
    USPC .......................................................... 709/219
    See application file for complete search history.

(56) References Cited

U.S. PATENT DOCUMENTS

| | | |
|---|---|---|
| 7,145,898 B1 | 12/2006 | Elliott |
| 7,266,591 B1 | 9/2007 | Johnston |
| 7,379,993 B2 | 5/2008 | Valdes et al. |
| 7,636,348 B2 | 12/2009 | Bettis et al. |
| 7,730,309 B2 | 6/2010 | Zimmermann |
| 8,015,484 B2 | 9/2011 | Backer |
| 8,250,635 B2 | 8/2012 | Chari et al. |
| 8,300,632 B2 | 10/2012 | Davis et al. |
| 8,467,308 B2 | 6/2013 | Johnston |
| 8,494,507 B1 | 7/2013 | Tedesco et al. |
| 8,601,144 B1 | 12/2013 | Ryner |
| 8,605,711 B1 | 12/2013 | Sinnreich et al. |
| 8,606,950 B2 | 12/2013 | Glatron et al. |
| 8,693,392 B2 | 4/2014 | Cooper et al. |
| 8,695,077 B1 | 4/2014 | Gerhard et al. |
| 8,737,596 B2 | 5/2014 | Kelley et al. |
| 8,744,147 B2 | 6/2014 | Torti |
| 8,832,271 B2 | 9/2014 | McCarty |
| 8,856,236 B2 | 10/2014 | Moore et al. |
| 8,861,692 B1 | 10/2014 | Phelps et al. |
| 8,867,731 B2 | 10/2014 | Lum et al. |
| 8,996,662 B2 * | 3/2015 | Butler .................... H04L 67/28 709/219 |
| 2002/0161685 A1 | 10/2002 | Dwinnell |
| 2003/0112766 A1 | 6/2003 | Riedel et al. |
| 2003/0120599 A1 | 6/2003 | Agboatwalla et al. |
| 2003/0131245 A1 | 7/2003 | Linderman |
| 2003/0188193 A1 | 10/2003 | Venkataramappa |
| 2004/0019494 A1 | 1/2004 | Ridgeway et al. |
| 2004/0081173 A1 | 4/2004 | Feather |
| 2004/0093515 A1 | 5/2004 | Reeves, Jr. |
| 2004/0167984 A1 | 8/2004 | Herrman |
| 2004/0216173 A1 | 10/2004 | Horoszowski et al. |
| 2005/0084082 A1 | 4/2005 | Horvitz et al. |
| 2005/0177380 A1 | 8/2005 | Pritchard et al. |
| 2006/0104526 A1 | 5/2006 | Gringeler et al. |
| 2006/0155814 A1 | 7/2006 | Bennett et al. |
| 2006/0159063 A1 | 7/2006 | Kumar |
| 2006/0200855 A1 | 9/2006 | Willis |
| 2006/0230438 A1 | 10/2006 | Shappir et al. |
| 2007/0083929 A1 | 4/2007 | Sprosts et al. |
| 2007/0143408 A1 | 6/2007 | Daigle |
| 2007/0255662 A1 | 11/2007 | Tumminaro |
| 2007/0283423 A1 | 12/2007 | Bradley et al. |
| 2008/0046414 A1 | 2/2008 | Haub et al. |
| 2008/0046457 A1 | 2/2008 | Haub et al. |
| 2008/0046838 A1 | 2/2008 | Haub et al. |
| 2008/0127137 A1 | 5/2008 | Becker et al. |
| 2008/0162642 A1 | 7/2008 | Bachiri et al. |
| 2008/0192646 A1 | 8/2008 | Song et al. |
| 2008/0270541 A1 | 10/2008 | Keener et al. |
| 2009/0070477 A1 | 3/2009 | Baum et al. |
| 2009/0094684 A1 | 4/2009 | Chinnusamy et al. |
| 2009/0300060 A1 | 12/2009 | Beringer et al. |
| 2010/0011282 A1 | 1/2010 | Dollard et al. |
| 2010/0023519 A1 | 1/2010 | Kailash et al. |
| 2010/0024019 A1 | 1/2010 | Backlund |
| 2010/0037324 A1 | 2/2010 | Grant et al. |
| 2010/0246571 A1 | 9/2010 | Geppert et al. |
| 2011/0102930 A1 | 5/2011 | Johnston et al. |
| 2011/0206013 A1 | 8/2011 | Aramoto et al. |
| 2011/0238862 A1* | 9/2011 | Chaturvedi et al. .......... 709/238 |
| 2012/0001932 A1 | 1/2012 | Burnett et al. |
| 2012/0079031 A1 | 3/2012 | Matthews et al. |
| 2012/0087302 A1 | 4/2012 | Chaturvedi et al. |
| 2012/0137231 A1 | 5/2012 | Maxfield et al. |
| 2012/0158862 A1 | 6/2012 | Mosko et al. |
| 2012/0192086 A1 | 7/2012 | Ghods et al. |
| 2013/0002799 A1 | 1/2013 | Mock |
| 2013/0078972 A1 | 3/2013 | Levien et al. |
| 2013/0091286 A1 | 4/2013 | Spencer |
| 2013/0138829 A1 | 5/2013 | Bulava |
| 2013/0247030 A1* | 9/2013 | Kay ...................... H04L 67/34 717/178 |
| 2013/0321340 A1 | 12/2013 | Seo et al. |
| 2013/0325934 A1 | 12/2013 | Fausak et al. |
| 2013/0346329 A1 | 12/2013 | Alib-Bulatao et al. |
| 2014/0013202 A1 | 1/2014 | Schlumberger |
| 2014/0043994 A1 | 2/2014 | Bansal et al. |
| 2014/0095633 A1 | 4/2014 | Yoakum |
| 2014/0095724 A1 | 4/2014 | Yoakum et al. |
| 2014/0095731 A1 | 4/2014 | Carey et al. |
| 2014/0108594 A1 | 4/2014 | Siegel et al. |
| 2014/0126708 A1 | 5/2014 | Sayko |
| 2014/0126714 A1 | 5/2014 | Sayko |
| 2014/0126715 A1 | 5/2014 | Lum et al. |
| 2014/0143823 A1 | 5/2014 | Manchester et al. |
| 2014/0149512 A1 | 5/2014 | Leitch |
| 2014/0161237 A1 | 6/2014 | Tolksdorf |
| 2014/0201820 A1 | 7/2014 | Li et al. |
| 2014/0219167 A1 | 8/2014 | Santhanam et al. |
| 2014/0222894 A1 | 8/2014 | Gangadharan et al. |
| 2014/0222930 A1 | 8/2014 | Gangadharan et al. |
| 2014/0223452 A1 | 8/2014 | Santhanam et al. |
| 2014/0237057 A1 | 8/2014 | Khodorenko |
| 2014/0241215 A1 | 8/2014 | Massover et al. |
| 2014/0245143 A1 | 8/2014 | Saint-Marc |
| 2014/0258822 A1 | 9/2014 | Li et al. |
| 2014/0269326 A1 | 9/2014 | Westin et al. |
| 2014/0270104 A1 | 9/2014 | O'Oonnor |
| 2014/0282054 A1 | 9/2014 | Yoakum |
| 2014/0282135 A1 | 9/2014 | Segre |
| 2014/0282399 A1 | 9/2014 | Gorelik et al. |
| 2014/0282765 A1 | 9/2014 | Casey et al. |
| 2014/0282903 A1 | 9/2014 | Singh et al. |
| 2014/0324979 A1 | 10/2014 | Gao et al. |
| 2014/0325078 A1 | 10/2014 | Shan et al. |
| 2014/0344169 A1 | 11/2014 | Phelps et al. |
| 2014/0348044 A1 | 11/2014 | Narayanan et al. |
| 2014/0365676 A1 | 12/2014 | Yoakum |
| 2014/0379931 A1 | 12/2014 | Gaviria |
| 2015/0002614 A1 | 1/2015 | Zino et al. |
| 2015/0002619 A1 | 1/2015 | Johnston et al. |
| 2015/0006610 A1 | 1/2015 | Johnston et al. |
| 2015/0006611 A1 | 1/2015 | Johnston et al. |
| 2015/0026473 A1 | 1/2015 | Johnston et al. |
| 2015/0036690 A1* | 2/2015 | Pastro ......................... 370/401 |
| 2015/0039687 A1 | 2/2015 | Waxman et al. |
| 2015/0039760 A1 | 2/2015 | Yoakum |
| 2015/0052067 A1 | 2/2015 | Thiyagarajan et al. |
| 2015/0180825 A1 | 6/2015 | Ren et al. |

FOREIGN PATENT DOCUMENTS

| | | |
|---|---|---|
| GB | 2295747 A | 6/1996 |
| GB | 2468758 A | 9/2010 |
| GB | 2468759 A | 9/2010 |
| GB | 2517833 A | 3/2015 |
| JP | 2002207683 A | 7/2002 |
| JP | 2002374318 A | 12/2002 |
| JP | 2005346556 A | 12/2005 |
| JP | 2006050407 A | 2/2006 |

(56) References Cited

FOREIGN PATENT DOCUMENTS

| | | | |
|---|---|---|---|
| JP | 2011504665 A | 2/2011 | |
| WO | 2014060008 A1 | 4/2014 | |
| WO | 2014123738 A1 | 8/2014 | |
| WO | 2014190094 A1 | 11/2014 | |
| WO | 2015032277 A1 | 3/2015 | |

OTHER PUBLICATIONS

Baugher et al., "The Secure Real-time Transport Protocol (SRTP)," Network Working Group, Request for Comments: 3711, Standards Track, The Internet Society, Mar. 2004, 51 pages.

Johnston et al., "WebRTC: APIs and RTCWEB Protocols of the HTML5 Real-Time Web," (Book), Second Edition, Smashwords Edition, Digital Codex LLC, Jun. 2013, 254 pages.

Mahy et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.

McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.

Zimmermann et al., "ZRTP: Media Path Key Agreement for Unicast Secure RTP," Internet Engineering Task Force, Request for Comments: 6189, Informational, IETF Trust, Apr. 2011, 102 pages.

Johnston, Alan et al., "Taking on WebRTC in an Enterprise," IEEE Communications Magazine, Apr. 2013, pp. 48-54, vol. 51, Issue 4.

Search Report for British patent application GB1317121.0 dated Mar. 14, 2014, 3 pages.

Search Report for British patent application GB1317122.8 dated Mar. 11, 2014, 3 pages.

Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.

Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.

Berners-Lee, Tim, "Socially Aware Cloud Storage," Notes on web design, Aug. 17, 2009, http://www.w3.org/DesignIssues/CloudStorage.html, 9 pages.

Chandra, Ramesh et al., "Separating Web Applications from User Data Storage with BStore," presented at the USENIX Conference on Web Application Development, Jun. 2010, Boston, Massachusettes, 13 pages.

Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.

Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.

Hsu, F. et al., "Secure File System Services for Web 2.0 Applications," presented at the ACM Cloud Computing Security Workshop, Nov. 13, 2009, Chicago, Illinois, Association for Computing Machinery, 7 pages.

Joshi, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_WhitePaper.pdf, 54 pages.

Vahdat, Amin et al., "WebFS: A Global Cache Coherent File System," UC Berkeley, Dec. 1996, retrieved Sep. 16, 2014 from https://www.cs.duke.edu/~vahdat/webfs/webfs.html, 12 pages.

Non-Final Office Action for U.S. Appl. No. 14/037,440, dated Sep. 12, 2014, 15 pages.

Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.

Search Report for British patent application GB1411584.4 dated Dec. 30, 2014, 4 pages.

Search Report for British patent application GB1411580.2 dated Dec. 30, 2014, 4 pages.

Non-Final Office Action for U.S. Appl. No. 13/931,968, dated Dec. 8, 2014, 6 pages.

Non-Final Office Action for U.S. Appl. No. 13/835,913, dated Nov. 20, 2014, 15 pages.

Non-Final Office Action for U.S. Appl. No. 13/803,292, dated Jan. 27, 2015, 13 pages.

Non-Final Office Action for U.S. Appl. No. 14/050,891, dated Jan. 29, 2015, 9 pages.

Non-Final Office Action for U.S. Appl. No. 13/955,023, dated Feb. 2, 2015, 12 pages.

Notice of Allowance for U.S. Appl. No. 13/931,968, dated Mar. 23, 2015, 7 pages.

Final Office Action for U.S. Appl. No. 13/835,913, dated Mar. 26, 2015, 17 pages.

Final Office Action for U.S. Appl. No. 14/037,440, dated Feb. 11, 2015, 19 pages.

Barth, A. "The Web Origin Concept," Internet Engineering Task Force (IETF), Request for Comments 6454 (RFC 6454), Dec. 2011, 19 pages, http://www.ietf.org/rfc/rfc6454.txt.

Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, 26 pages.

Jesup, R. et al., "DTLS Encapsulation of SCTP Packets for RTCWEB," IETF: Network Working Group, Internet Draft, Feb. 16, 2013, 6 pages.

Johnston, A. et al., "An Origin Attribute for the STUN Protocol," Internet Engineering Task Force (IETF), Internet-Draft, Jul. 20, 2014, 14 pages, https://tools.ietf.org/html/draft-ietf-tram-stun-origin-00.

Rescorla, E., "Security Considerations for RTC-Web," IETF RTCWEB, Internet Draft, Jan. 22, 2013, 16 pages.

Rescorla, E., "WebRTC Security Architecture," IETF RTCWEB, Internet Draft, Jul. 14, 2013, 30 pages.

Corrected Notice of Allowability for U.S. Appl. No. 13/931,968, dated Apr. 24, 2015, 4 pages.

Advisory Action for U.S. Appl. No. 14/037,440, dated May 20, 2015, 3 pages.

Search Report for British Patent Application GB1419338.7, dated Apr. 27, 2015, 4 pages.

Search Report for British Patent Application GB1419334.6, dated Apr. 28, 2015, 6 pages.

Notice of Allowance for U.S. Appl. No. 13/944,368, dated Apr. 1, 2015, 8 pages.

Non-Final Office Action for U.S. Appl. No. 13/931,967, dated May 5, 2015, 10 pages.

Non-Final Office Action for U.S. Appl. No. 13/931,970, dated May 7, 2015, 9 pages.

Author Unknown, "WebRTC," WebRTC.org, Date Accessed: Jan. 26, 2016, 4 pages, http://webrtc.org/.

Notice of Allowance for U.S. Appl. No. 13/863,662, dated Feb. 1, 2016, 17 pages.

Final Office Action for U.S. Appl. No. 14/141,798, dated Dec. 24, 2015, 10 pages.

Non-Final Office Action for U.S. Appl. No. 14/174,371, dated Feb. 18, 2016, 18 pages.

Non-Final Office Action for U.S. Appl. No. 13/931,970, dated Feb. 23, 2016, 11 pages.

Search Report for British Patent Application No. GB1423089.0, dated Jul. 6, 2015, 4 pages.

Bergkvist, Adam et al., "WebRTC 1.0: Real-time Communication Between Browsers," W3C Working Draft, Feb. 9, 2012, http://www.w3.org/TR/2012/WD-webrtc-20120209/, 42 pages.

Notice of Reason for Refusal for Japanese Patent Application 2013-201228, dispatched Jun. 11, 2015, 8 pages.

(56) References Cited

OTHER PUBLICATIONS

Extended European Search Report for European Patent Application 15161452.6, dated Jun. 23, 2015, 5 pages.
Non-Final Office Action for U.S. Appl. No. 13/955,711, dated Nov. 9, 2015, 10 pages.
Notice of Allowance for U.S. Appl. No. 14/050,891, dated Nov. 10, 2015, 10 pages.
Non-Final Office Action for U.S. Appl. No. 13/955,023, dated Dec. 9, 2015, 13 pages.
Non-Final Office Action for U.S. Appl. No. 14/037,440, dated Oct. 22, 2015, 15 pages.
Advisory Action for U.S. Appl. No. 13/931,967, dated Nov. 3, 2015, 3 pages.
Advisory Action for U.S. Appl. No. 13/931,970, dated Nov. 5, 2015, 3 pages.
Non-Final Office Action for U.S. Appl. No. 14/068,943, dated Dec. 2, 2015, 16 pages.
Non-Final Office Action for U.S. Appl. No. 14/255,429, dated Nov. 9, 2015, 26 pages.
Examination Report for British Patent Application GB1411584.4, dated Aug. 21, 2015, 1 page.
Examination Report for British Patent Application GB1411580.2, dated Aug. 21, 2015, 1 page.
Notification of Reasons for Refusal for Japanese Patent Application 2013-201221, dated Aug. 25, 2015, 8 pages.
Rodriguez, Pedro et al., "Advanced Videoconferencing Services Based on WebRTC," IADIS International Conferences Web Based Communities and Social Media 2012 and Collaborative Technologies 2012, Jul. 17-23, 2012, pp. 180-184, http://www.iadisportal.org/wbc-2012-proceedings.
Non-Final Office Action for U.S. Appl. No. 13/835,913, dated Sep. 3, 2015, 19 pages.
Non-Final Office Action for U.S. Appl. No. 13/912,520, dated Sep. 9, 2015, 21 pages.
Non-Final Office Action for U.S. Appl. No. 13/863,662, dated Sep. 25, 2015, 23 pages.
Advisory Action for U.S. Appl. No. 13/803,292, dated Aug. 21, 2015, 3 pages.
Non-Final Office Action for U.S. Appl. No. 13/803,292, dated Oct. 9, 2015, 13 pages.
Advisory Action and Examiner-Initiated Interview Summary for U.S. Appl. No. 14/050,891, dated Sep. 29, 2015, 4 pages.
Final Office Action for U.S. Appl. No. 13/931,967, dated Aug. 20, 2015, 12 pages.
Final Office Action for U.S. Appl. No. 13/931,970, dated Aug. 27, 2015, 10 pages.
Advisory Action for U.S. Appl. No. 13/835,913, dated Jun. 10, 2015, 3 pages.
Final Office Action for U.S. Appl. No. 13/803,292, dated Jun. 12, 2015, 17 pages.
Final Office Action and Examiner Initiated Interview Summary for U.S. Appl. No. 14/050,891, dated Jun. 29, 2015, 11 pages.
Final Office Action for U.S. Appl. No. 13/955,023, dated Jul. 20, 2015, 17 pages.
Corrected Notice of Allowability for U.S. Appl. No. 13/944,368, dated Jul. 23, 2015, 4 pages.
Non-Final Office Action for U.S. Appl. No. 14/141,798, dated Jul. 17, 2015, 13 pages.
Rosenberg et al., "Session Traversal Utilities for NAT (STUN)," Network Working Group, RFC 5389, Oct. 2008, 51 pages.
Macdonald et al., "NAT Behavior Discovery using Session Traversal Utilities for NAT (STUN)," Internet Engineering Task Force, RFC 5780, May 2010, 27 pages.
Official Action (with English translation) for Chinese Patent Application No. 201410601772.0, dated Sep. 30, 2018, 22 pages.

* cited by examiner

PROVIDING ORIGIN INSIGHT FOR WEB APPLICATIONS VIA SESSION TRAVERSAL UTILITIES FOR NETWORK ADDRESS TRANSLATION (STUN) MESSAGES, AND RELATED METHODS, SYSTEMS, AND COMPUTER-READABLE MEDIA

BACKGROUND

Field of the Disclosure

The technology of the disclosure relates generally to Session Traversal Utilities for Network Address Translation (STUN) methods and protocols for enabling Network Address Translation (NAT) traversal.

Technical Background

The advent of Web Real-Time Communications (WebRTC), an ongoing effort to develop industry standards for integrating real-time communications functionality into web clients such as web browsers, has resulted in a proliferation of web clients capable of direct interaction with other web clients. The real-time communications functionality enabled by WebRTC is accessible by web developers via standard markup tags, such as those provided by version 5 of the Hyper Text Markup Language (HTML5), and client-side scripting Application Programming Interfaces (APIs) such as JavaScript APIs. More information regarding WebRTC may be found in "WebRTC: APIs and RTCWEB Protocols of the HTML5 Real-Time Web," by Alan B. Johnston and Daniel C. Burnett, $2^{nd}$ Edition (2013 Digital Codex LLC), which is incorporated in its entirety herein by reference.

Direct interaction among WebRTC-enabled web clients or other real-time communications web clients may be hampered by network traversal issues caused by the presence of Network Address Translation (NAT) devices, such as network traffic routing devices, in the network path between the web clients. A NAT device maps the Internet Protocol (IP) addresses of multiple web clients on a local network to a single publicly exposed IP address. As packets of network traffic pass from each web client to the Internet, the NAT device translates the source address of each packet from the web client's IP address on the local network to the public IP address. When a reply returns to the public IP address from the Internet, the NAT device uses connection tracking data to determine the local network address to which the reply is to be forwarded. Because a web client on the local network may not be aware of the public IP address provided by the NAT device, the web client may be unable to establish a direct connection with another web client outside the local network.

To address these network traversal issues, a network protocol known as Session Traversal Utilities for Network Address Translation (STUN) (defined by the Request for Comments (RFC) 5389, available online at http://www.ietf.org/rfc/rfc5389.txt) has been developed. A WebRTC-enabled web client may use a STUN server to determine the public IP address allocated to it by a NAT device, and may provide the public IP address to a remote endpoint in order to establish real-time communications. An extension to STUN known as Traversal Using Relays around Network Address Translation (TURN) (defined by RFC 5766, available online at http://www.ietf.org/rfc/rfc5766.txt) provides additional network traversal capabilities by relaying network traffic through a TURN server on the Internet.

STUN provides both short-term and long-term credential mechanisms that a STUN server and client may use to authenticate STUN messages. Both mechanisms rely on the STUN server and client exchanging a credential (e.g., a username and password) using some other protocol prior to authenticating a STUN message. However, STUN includes no mechanism for providing STUN services based on an origin of a web application (e.g., a "web origin" as defined by RFC 6454, available online at http://www.ietf.org/rfc/rfc6454.txt) that generates a STUN message. For example, a STUN server may be unable to determine whether a web application that is attempting to send a STUN message to the STUN server originated from a source that is authorized to access the STUN server. This may pose challenges to entities such as enterprises that wish to permit access to enterprise STUN servers only by enterprise web applications or other web applications originating from authorized sources.

SUMMARY OF THE DETAILED DESCRIPTION

Embodiments disclosed in the detailed description provide origin insight for web applications via Session Traversal Utilities for Network Address Translation (STUN) messages. Related methods, systems, and computer-readable media are also disclosed. In some embodiments, a web client is configured to determine an origin identifier that identifies the source of a web application. The web client then generates a STUN message that includes the origin identifier, and transmits the STUN message to a STUN server. The STUN server is configured to extract the origin identifier, and determine whether to provide STUN services to the web application based on the origin identifier. In this manner, access to the STUN server can be regulated based on the origin of web applications requesting STUN services.

In this regard, in one embodiment, a method for providing origin insight for web applications via STUN messages is provided. The method comprises determining, by a web client executing on a computing device, an origin identifier for a web application attempting to send a STUN message to a STUN server. The method further comprises generating the STUN message incorporating the origin identifier for the web application, and transmitting the STUN message to the STUN server.

In another embodiment, a method for providing STUN services by STUN servers to web applications based on origin insight is provided. The method comprises receiving, by a STUN server executing on a computing device, a STUN message from a web client. The method further comprises extracting an origin identifier for a web application from the STUN message. The method additionally comprises determining whether to provide a STUN service to the web application based on the origin identifier for the web application. The method also comprises, responsive to a determination that the STUN service should not be provided, disregarding the STUN message. The method further comprises, responsive to a determination that the STUN service should be provided, processing the STUN message.

In another embodiment, a system for providing origin insight for web applications via STUN messages is provided. The system comprises at least one communications interface, and a computing device associated with the at least one communications interface. The computing device comprises a web client executing a web application attempting to send a STUN message to a STUN server. The web client is configured to determine an origin identifier for the web application and generate the STUN message incorporating the origin identifier for the web application. The web client is also configured to transmit the STUN message to the STUN server.

In another embodiment, a system for providing STUN services by STUN servers to web applications based on origin insight is provided. The system comprises at least one communications interface, and a computing device associated with the at least one communications interface. The computing device comprises a STUN server configured to receive a STUN message from a web client. The STUN server is further configured to extract an origin identifier for a web application from the STUN message. The STUN server is additionally configured to determine whether to provide a STUN service to the web application based on the origin identifier for the web application. The STUN server is also configured to, responsive to a determination that the STUN service should not be provided, disregard the STUN message. The STUN server is further configured to, responsive to a determination that the STUN service should be provided, process the STUN message.

In another embodiment, a non-transitory computer-readable medium is provided, having stored thereon computer-executable instructions to cause a processor to implement a method for providing origin insight for web applications via STUN messages. The method implemented by the computer-executable instructions comprises determining an origin identifier for a web application attempting to send a STUN message to a STUN server. The method implemented by the computer-executable instructions further comprises generating the STUN message incorporating the origin identifier for the web application. The method implemented by the computer-executable instructions also comprises transmitting the STUN message to the STUN server.

In another embodiment, a non-transitory computer-readable medium is provided, having stored thereon computer-executable instructions to cause a processor to implement a method for providing STUN services by STUN servers to web applications based on origin insight. The method implemented by the computer-executable instructions comprises receiving a STUN message from a web client. The method implemented by the computer-executable instructions further comprises extracting an origin identifier for a web application from the STUN message. The method implemented by the computer-executable instructions additionally comprises determining whether to provide a STUN service to the web application based on the origin identifier for the web application. The method implemented by the computer-executable instructions also comprises, responsive to a determination that the STUN service should not be provided, disregarding the STUN message. The method implemented by the computer-executable instructions further comprises, responsive to a determination that the STUN service should be provided, processing the STUN message.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description provide origin insight for web applications via Session Traversal Utilities for Network Address Translation (STUN) messages. Related methods, systems, and computer-readable media are also disclosed. In some embodiments, a web client is configured to determine an origin identifier that identifies the source of a web application. The web client then generates a STUN message that includes the origin identifier, and transmits the STUN message to a STUN server. The STUN server is configured to extract the origin identifier, and determine whether to provide STUN services to the web application based on the origin identifier. In this manner, access to the STUN server can be regulated based on the origin of web applications requesting STUN services.

In this regard, in one embodiment, a method for providing origin insight for web applications via STUN messages is provided. The method comprises determining, by a web client executing on a computing device, an origin identifier for a web application attempting to send a STUN message to a STUN server. The method further comprises generating the STUN message incorporating the origin identifier for the web application, and transmitting the STUN message to the STUN server.

In another embodiment, a method for providing STUN services by STUN servers to web applications based on origin insight is provided. The method comprises receiving, by a STUN server executing on a computing device, a STUN message from a web client. The method further comprises extracting an origin identifier for a web application from the STUN message. The method additionally comprises determining whether to provide a STUN service to the web application based on the origin identifier for the web application. The method also comprises, responsive to a determination that that the STUN service should not be provided, disregarding the STUN message. The method further comprises, responsive to a determination that the STUN service should be provided, processing the STUN message.

Figure 1:
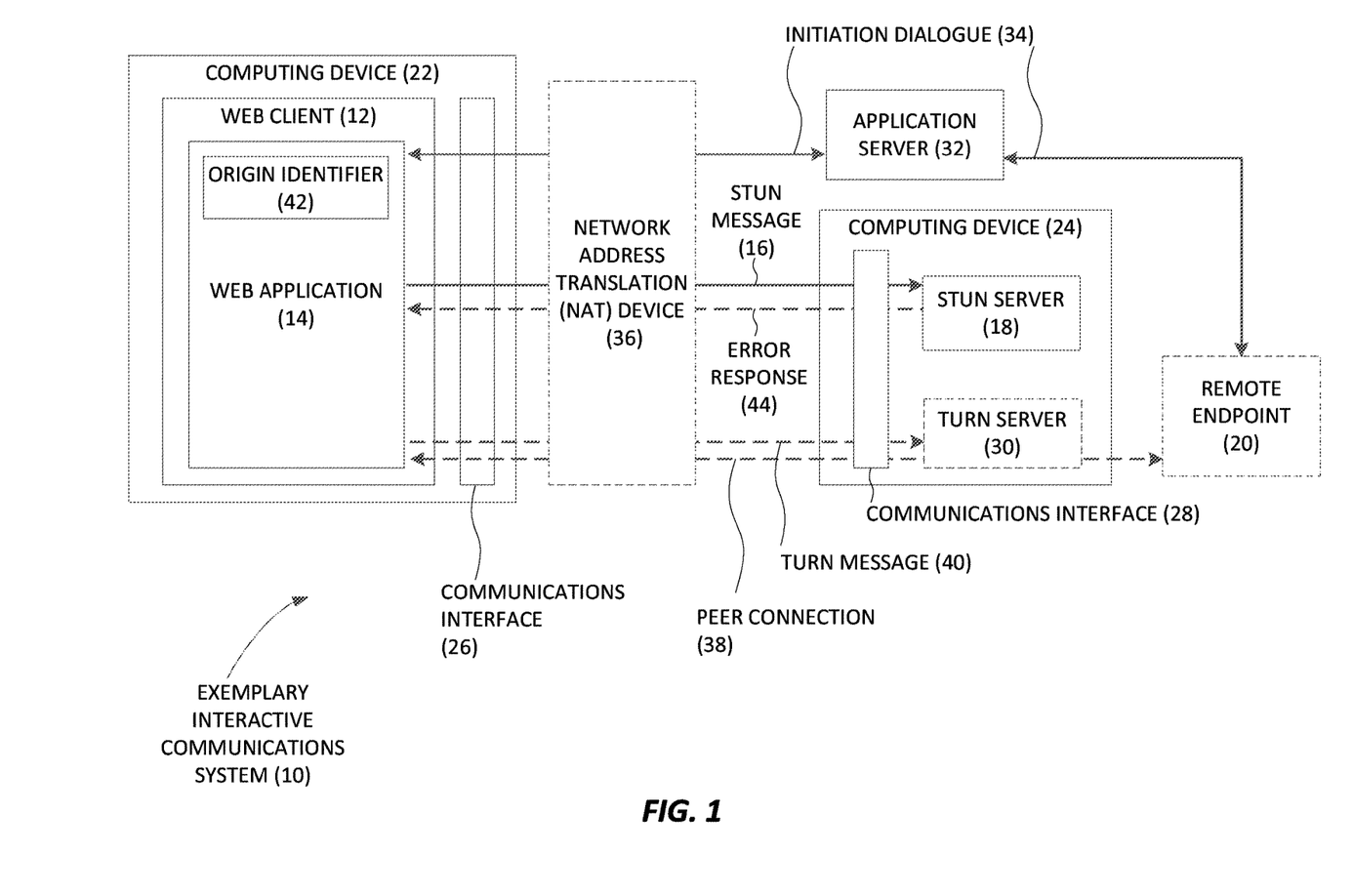
FIG. 1 is a conceptual diagram illustrating an exemplary interactive communications system including a web client for providing origin insight for web applications via Session Traversal Utilities for Network Address Translation (STUN) messages, and a STUN server for providing STUN services based on origin insight provided via STUN messages.

FIG. 1 illustrates an exemplary interactive communications system 10 for providing origin insight for web applications via STUN messages as disclosed herein. In particular, the exemplary interactive communications system 10 includes a web client 12 that provides origin insight for a web application 14 via a STUN message 16, and further includes a STUN server 18 that determines whether to provide STUN services to the web application 14 based on origin insight provided by the STUN message 16. The term "web application" refers generally to any web-enabled application configured to utilize STUN services, and may include a binary executable such as a mobile or desktop application and/or a compiled or interpreted script application such as a JavaScript application. As used herein, the term "STUN server" refers generally to servers configured to provide services according to the STUN protocol and/or any extension protocols based in whole or in part on STUN message exchanges, such as Traversal Using Relays around Network Address Translation (TURN). Accordingly, a "STUN server" may comprise a STUN server, a TURN server, or a STUN/TURN server. A "STUN service" may include public address discovery services provided by a STUN server, relay services provided by a TURN server, and/or other services related to providing public address discovery and/or relay services. A "STUN message" refers to any message formatted according to the STUN protocol, and may include messages comprising request/response transactions, indication transactions, and/or transport-related interaction, as non-limiting examples.

Before discussing details of the web client 12 and the STUN server 18, the establishment of an exemplary real-time interaction in the interactive communications system 10 of FIG. 1 is first described. In some embodiments, the real-time interaction may include a Web Real-Time Communications (WebRTC) interaction established between the web client 12 and a remote endpoint 20 using the STUN server 18. In FIG. 1, the web client 12 executes on a computing device 22, and the STUN server 18 executes on a computing device 24. Some embodiments may provide that the computing devices 22 and 24 may both be located within a same public or private network, or may be located within separate, communicatively coupled public or private networks. Some embodiments of the exemplary interactive communications system 10 of FIG. 1 may provide that each of the computing devices 22 and 24 may be any computing device having network communications capabilities, such as a smartphone, a tablet computer, a dedicated web appliance, a media server, a desktop or server computer, or a purpose-built communications device, as non-limiting examples. The computing devices 22 and 24 include communications interfaces 26 and 28, respectively, for physically connecting the computing devices 22 and 24 to one or more public and/or private networks. As seen in FIG. 1, some embodiments may provide that the computing device 24 further provides a TURN server 30 that is separate from the STUN server 18. Some embodiments may provide that the functionality of the STUN server 18 and the TURN server 30 are provided by a single STUN/TURN server. In some embodiments, the elements of the computing devices 22 and 24 may be distributed across more than one computing device 22, 24.

The web client 12 in this example may be a web browser application, a dedicated communications application, or an interface-less application such as a daemon or service application, as non-limiting examples. In some embodiments, the web client 12 is configured to execute client-side applications written in a scripting language, such as JavaScript. The web client 12 also provides application programming interfaces (APIs) to facilitate real-time communications (e.g., video, audio, and/or data interactive flows) with other web clients, user devices, or web servers. As non-limiting examples, the web client 12 may be a WebRTC client that implements the protocols, codecs, and APIs necessary to enable real-time communications via WebRTC. It is to be understood that the remote endpoint 20 of FIG. 1 also provides real-time communications functionality, the details of which are omitted for the sake of clarity.

An application server 32 is provided for serving a web-based real-time communications application to the web client 12 and the remote endpoint 20, and for relaying an initiation dialogue 34 during establishment of real-time communications. In some embodiments, the application server 32 may be a single server, while in some applications the application server 32 may comprise multiple servers that are communicatively coupled to each other. It is to be understood that the application server 32 may reside within the same public or private network as the computing devices 22 and/or 24, or may be located within a separate, communicatively coupled public or private network. In the example of FIG. 1, the web-based real-time communications application is the web application 14 configured to exchange (e.g., generate, send, and/or receive) STUN messages with the STUN server 18. Some embodiments may provide that the web application 14 is a WebRTC web application configured to establish WebRTC real-time communications using STUN and/or TURN.

The exemplary interactive communications system 10 optionally may further include a Network Address Translation (NAT) device 36, such as a network traffic routing device, in the network path between the computing device 22 and the remote endpoint 20. The NAT device 36 may map an Internet Protocol (IP) address of the computing device 22 to a single publicly exposed IP address. It is to be understood that, in some embodiments, the NAT device 36 may reside within the same public or private network as the computing devices 22 and/or 24, or may be located within a separate, communicatively coupled public or private network.

FIG. 1 further illustrates a peer connection 38 established between the web client 12 and the remote endpoint 20. As a non-limiting example, the peer connection 38 may carry WebRTC real-time communications comprising video, audio, and/or data interactive flows (not shown). To establish the peer connection 38, the web client 12 and the remote endpoint 20 may download a web-based real-time communications application (such as the web application 14) from the application server 32. The web client 12 and the remote endpoint 20 then engage in the initiation dialogue 34 via the application server 32. Typically, the initiation dialogue 34 takes place over secure web connections, such as Hyper Text Transfer Protocol Secure (HTTPS) connections. In some embodiments, the initiation dialogue 34 may include WebRTC session description objects, Hyper Text Transfer Protocol (HTTP) header data, certificates, cryptographic keys, and/or network routing data, as non-limiting examples. In some embodiments, the initiation dialogue 34 may comprise a WebRTC offer/answer exchange.

Once the initiation dialogue 34 is complete, the web client 12 and the remote endpoint 20 may engage in "hole punching" to determine the best way to establish direct communications. Hole punching is a technique, often using protocols such as Interactive Connectivity Establishment (ICE), in which the web client 12 and/or the remote endpoint 20 may establish a connection with an unrestricted third-party server that uncovers external and internal address information for use in direct communications. In the example of FIG. 1, the web application 14 engages in hole punching by communicating with the STUN server 18 via the STUN message 16 to determine the public IP address by which the computing device 22 may be reached. In some embodiments, the web client 12 may also communicate with the TURN server 30 via a TURN message 40 to cause the peer connection 38 to be relayed via the TURN server 30.

Typically, a server such as the STUN server 18 provides short-term and long-term credential mechanisms that may be used to provide authentication of the STUN message 16, respectively. However, STUN does not provide an inherent mechanism for indicating the origin of a client application such as the web application 14. As a result, an entity operating the STUN server 18 may find it impossible or impractical to provide STUN services only to web applications that originate from an approved source. For instance, an enterprise may wish to allow only enterprise web applications originating from enterprise-controlled application servers to access to the STUN server 18.

In this regard, the web client 12 and the STUN server 18 of FIG. 1 are configured to provide origin insight for web applications via STUN messages. According to embodiments described herein, the web client 12 determines an origin identifier 42 for the web application 14. In some embodiments, determining the origin identifier 42 may be accomplished by the web client 12 as part of the process of downloading the web application 14 from the application server 32. Some embodiments of the web client 12 may determine the origin identifier 42 based on an embedded or hardcoded origin identifier 42, and/or may obtain the origin identifier 42 from an external source such as an origin verification server.

The origin identifier 42 identifies the application server 32 as the origin of the web application 14, and may include a related protocol indicated by a URL scheme, a Domain Name System (DNS) name an IP address, and/or an optional port number, as non-limiting examples. In some embodiments, the origin identifier 42 may be related to HTTP origin of a web page or browser content, and may include all of the contents of the HTTP origin or only a subset. In some embodiments, the origin identifier 42 may also include other information useful for identifying the application server 32 or local file system file access as the origin of the web application 14 and/or other applications, browser plug-ins, or browser extensions, as non-limiting examples.

When requesting a STUN service from the STUN server 18, the web client 12 incorporates the origin identifier 42 into the STUN message 16. The web client 12 disallows the web application 14 from setting or modifying the origin identifier 42 in the STUN message 16. Some embodiments may provide that the origin identifier 42 is included as a comprehension-optional attribute (not shown) of the STUN message 16, as provided in RFC 5389. In this manner, a STUN server that receives the STUN message 16 but is not configured to utilize the origin identifier 42 may safely ignore the attribute containing the origin identifier 42.

Upon receiving the STUN message 16 containing the origin identifier 42 from the web client 12, the STUN server 18 is configured to extract the origin identifier 42. This may be accomplished in some embodiments by accessing the comprehension-optional attribute of the STUN message 16 in which the origin identifier 42 is stored. The STUN server 18 may then determine whether to provide STUN services to the web application 14 based on the origin identifier 42. As non-limiting examples, the STUN server 18 may compare the origin identifier 42 to a whitelist of approved origins and/or a blacklist of disapproved origins that are specified by an enterprise policy (not shown). If the web application 14 is determined to originate from an approved source based on the origin identifier 42, the STUN message 16 may be processed by the STUN server 18. However, if the web application 14 does not originate from an approved source, the STUN message 16 may be disregarded or discarded by the STUN server 18. In some embodiments, the STUN server 18 may generate an error response 44 to the web application 14.

It is to be understood that, in some embodiments, the web client 12 may interact with the TURN server 30 in the same manner described above with respect to the STUN server 18. Thus, the web client 12 may provide the origin identifier 42 of the web application 14 to the TURN server 30 via the TURN message 40. The TURN server 30 may then choose to provide or refuse TURN services to the web application 14 based on the origin identifier 42.

Figure 2:
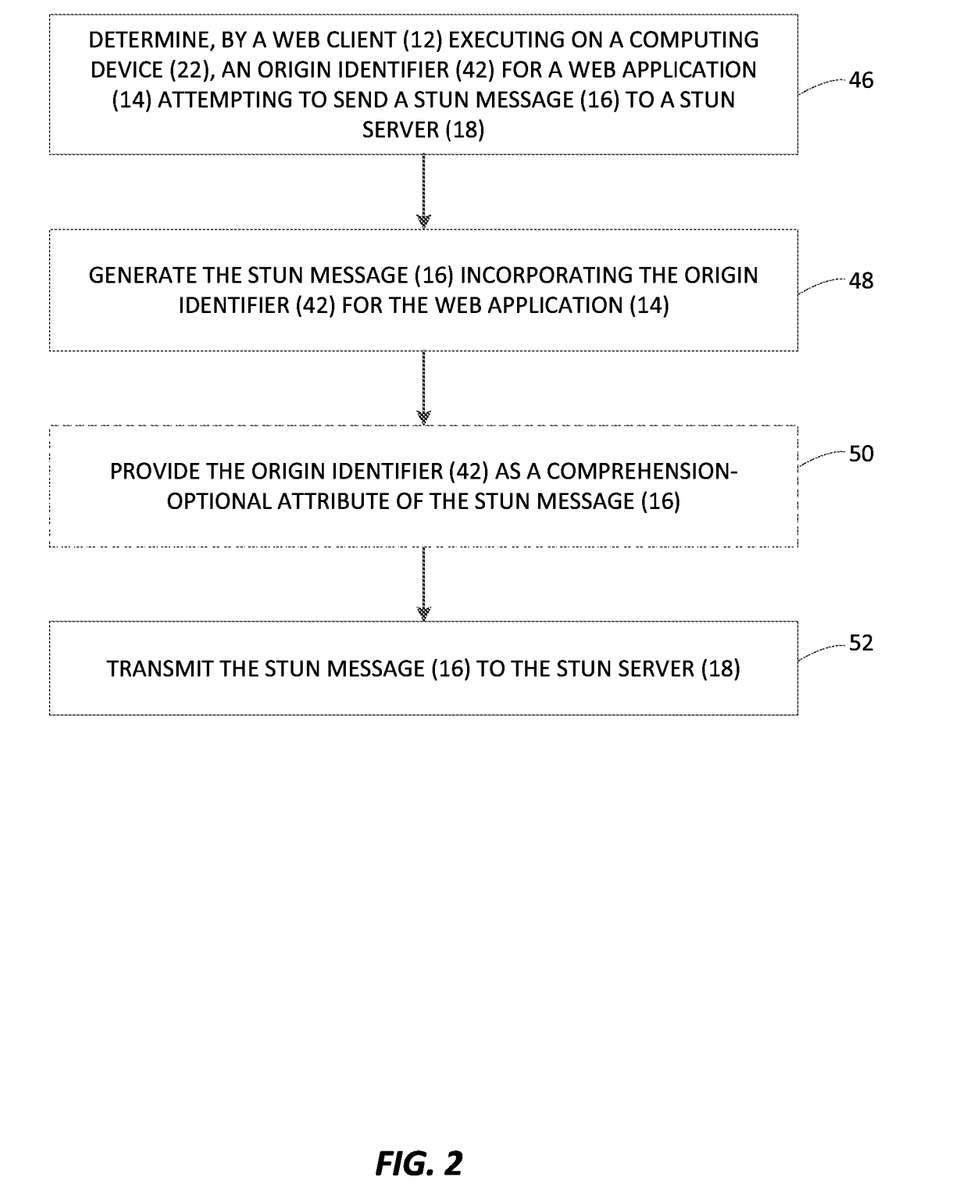
FIG. 2 is a flowchart illustrating exemplary operations for providing origin insight for web applications via STUN messages by the web client of FIG. 1.

To illustrate exemplary operations for providing origin insight for web applications via STUN messages by the web client 12 of FIG. 1, FIG. 2 is provided. For the sake of clarity, elements of FIG. 1 are referenced in describing FIG. 2. Operations begin with a web client 12, executing on a computing device 22, determining an origin identifier 42 for a web application 14 attempting to send a STUN message 16 to a STUN server 18 (block 46). In some embodiments, the web client 12 may be a WebRTC client, and the web application 14 may be a WebRTC web application configured to establish WebRTC real-time communications (e.g., video, audio, and or data interactive flows) with a remote endpoint 20. Some embodiments may provide that the origin identifier 42 may include a protocol, a DNS name, and/or a port number, and may be derived from the contents of an HTTP origin of the web application 14 and/or a web page, as non-limiting examples.

The web client 12 next generates the STUN message 16 incorporating the origin identifier 42 for the web application 14 (block 48). In some embodiments, the origin identifier 42 may be provided as a comprehension-optional attribute of the STUN message 16 (block 50). The STUN message 16 may include all of the information constituting the origin identifier 42, or may include only a subset. The web client 12 then transmits the STUN message 16 to the STUN server 18 for processing (block 52).

Figure 3:
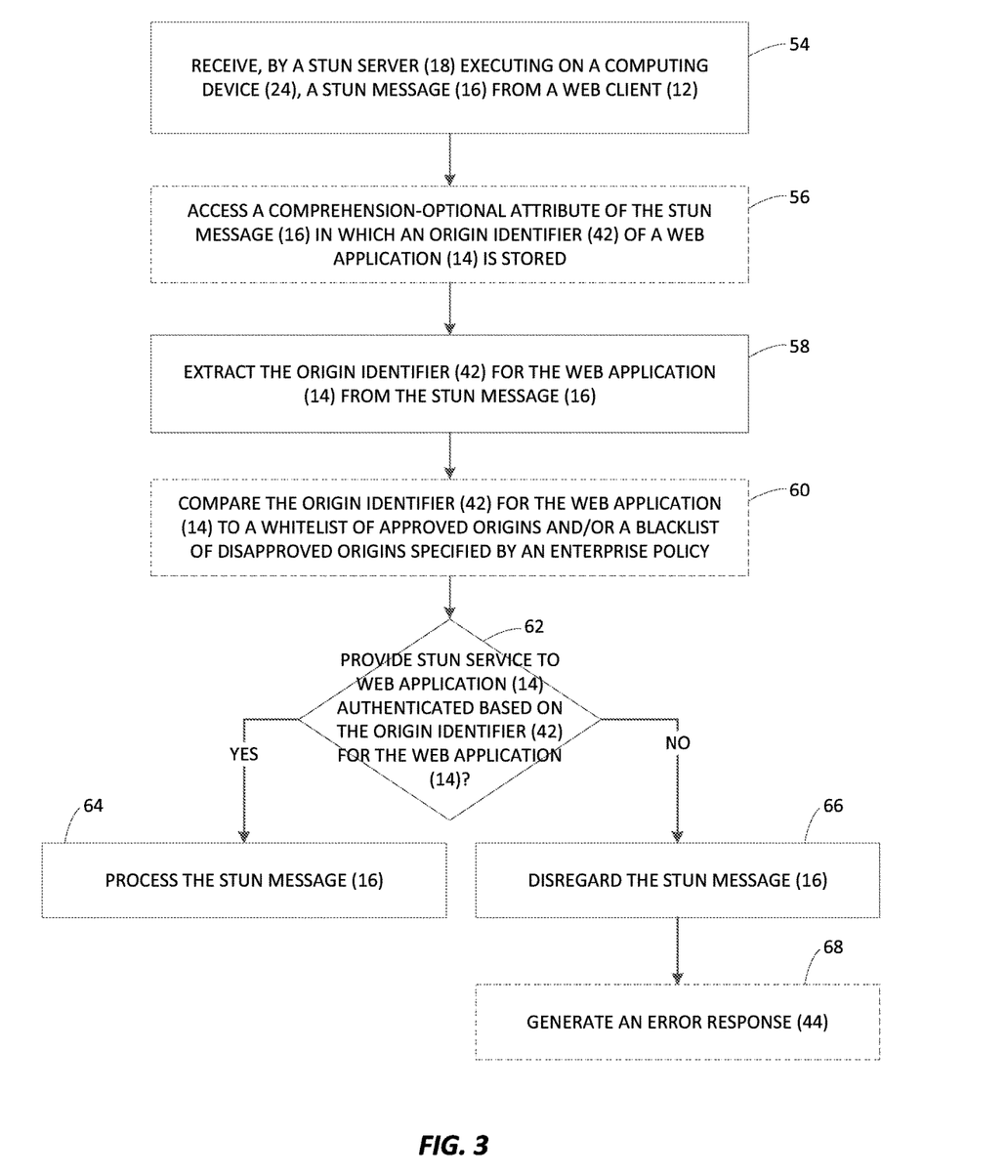
FIG. 3 is a flowchart illustrating exemplary operations for providing STUN services by the STUN server of FIG. 1 to web applications based on origin insight provided via STUN messages.

FIG. 3 is a flowchart illustrating exemplary operations for providing STUN services by STUN servers to web applications based on origin insight provided via STUN messages by the STUN server 18 of FIG. 1. In describing FIG. 3, elements of FIG. 1 are referenced for the sake of clarity. In FIG. 3, operations begin with a STUN server 18, executing on a computing device 24, receiving a STUN message 16 from a web client 12 (block 54). In some embodiments, the STUN server 18 may provide STUN and/or TURN services. The STUN server 18 may optionally access a comprehension-optional attribute of the STUN message 16 in which an origin identifier 42 of a web application 14 is provided in some embodiments (block 56). The STUN server 18 then extracts the origin identifier 42 for the web application 14 from the STUN message 16 (block 58).

At this point, the STUN server 18 has identified the origin of the web application 14 from which the STUN message 16 was sent. Thus, the STUN server 18 determines whether to provide STUN services to the web application 14 based on the origin identifier 42. In some embodiments, the STUN server 18 compares the origin identifier 42 for the web application 14 to a whitelist of approved origins and/or a blacklist of disapproved origins specified by an enterprise policy (block 60). For example, in the context of an enterprise network, the whitelist may include identifying information for domains or web application servers that are authorized to utilize the STUN server 18, while the blacklist may include domains or servers from which the STUN message 16 will be disregarded.

The STUN server 18 then determines whether to provide a STUN service to the web application 14 based on the origin identifier 42 for the web application 14 (block 62). If so, the STUN server 18 continues with processing the STUN message 16 (block 64). However, if the STUN server 18 determines at block 62 that STUN services should not be provided to the web application 14 based on the origin identifier 42, the STUN server 18 disregards the STUN message 16 (block 66). In some embodiments, the STUN server 18 may also generate an error response 44, which may be transmitted back to the web client 12 (block 68).

Figure 4:
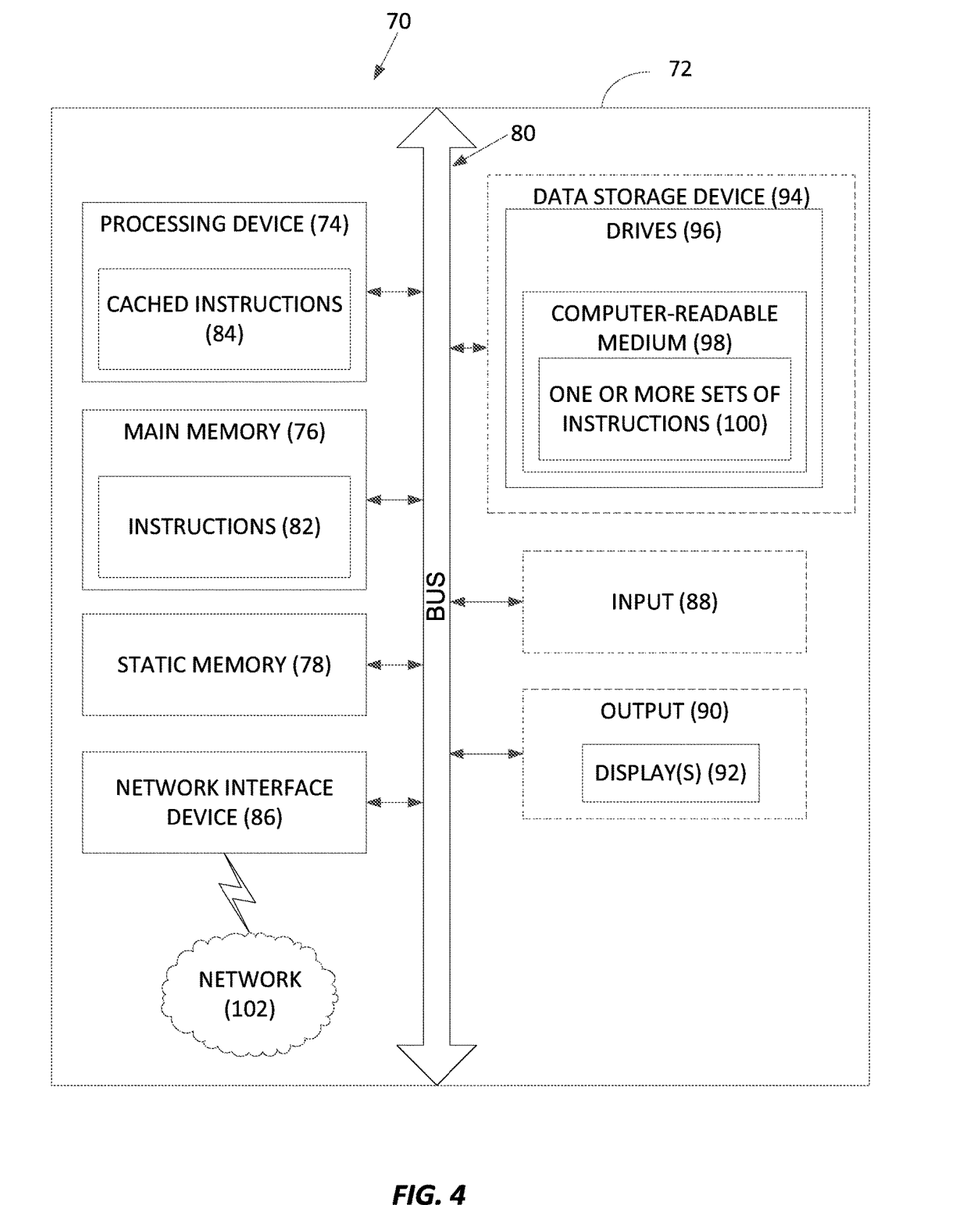
FIG. 4 is a block diagram of an exemplary processor-based system that may include the web client and/or the STUN server of FIG. 1.

FIG. 4 provides a block diagram representation of a processing system 70 in the exemplary form of an exemplary computer system 72 adapted to execute instructions to perform the functions described herein. In some embodiments, the processing system 70 may execute instructions to perform the functions of the web client 12 and/or the STUN server 18 of FIG. 1. In this regard, the processing system 70 may comprise the computer system 72, within which a set of instructions for causing the processing system 70 to perform any one or more of the methodologies discussed herein may be executed. The processing system 70 may be connected (as a non-limiting example, networked) to other machines in a local area network (LAN), an intranet, an extranet, or the Internet. The processing system 70 may operate in a client-server network environment, or as a peer machine in a peer-to-peer (or distributed) network environment. While only a single processing system 70 is illustrated, the terms "controller" and "server" shall also be taken to include any collection of machines that individually or jointly execute a set (or multiple sets) of instructions to perform any one or more of the methodologies discussed herein. The processing system 70 may be a server, a personal computer, a desktop computer, a laptop computer, a personal digital assistant (PDA), a computing pad, a mobile device, or any other device and may represent, as non-limiting examples, a server or a user's computer.

The exemplary computer system 72 includes a processing device or processor 74, a main memory 76 (as non-limiting examples, read-only memory (ROM), flash memory, dynamic random access memory (DRAM) such as synchronous DRAM (SDRAM), etc.), and a static memory 78 (as non-limiting examples, flash memory, static random access memory (SRAM), etc.), which may communicate with each other via a bus 80. Alternatively, the processing device 74 may be connected to the main memory 76 and/or the static memory 78 directly or via some other connectivity means.

The processing device 74 represents one or more processing devices such as a microprocessor, central processing unit (CPU), or the like. More particularly, the processing device 74 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 74 is configured to execute processing logic in instructions 82 and/or cached instructions 84 for performing the operations and steps discussed herein.

The computer system 72 may further include a communications interface in the form of a network interface device 86. It also may or may not include an input 88 to receive input and selections to be communicated to the computer system 72 when executing the instructions 82, 84. It also may or may not include an output 90, including but not limited to display(s) 92. The display(s) 92 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 72 may or may not include a data storage device 94 that includes using drive(s) 96 to store the functions described herein in a computer-readable medium 98, on which is stored one or more sets of instructions 100 (e.g., software) embodying any one or more of the methodologies or functions described herein. The functions can include the methods and/or other functions of the processing system 70, a participant user device, and/or a licensing server, as non-limiting examples. The one or more sets of instructions 100 may also reside, completely or at least partially, within the main memory 76 and/or within the processing device 74 during execution thereof by the computer system 72. The main memory 76 and the processing device 74 also constitute machine-accessible storage media. The instructions 82, 84, and/or 100 may further be transmitted or received over a network 102 via the network interface device 86. The network 102 may be an intra-network or an inter-network.

While the computer-readable medium 98 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 100. The term "machine-accessible storage medium" shall also be taken to include any medium that is capable of storing, encoding, or carrying a set of instructions for execution by the machine, and that cause the machine to perform any one or more of the methodologies disclosed herein. The term "machine-accessible storage medium" shall accordingly be taken to include, but not be limited to, solid-state memories, optical and magnetic media, and carrier wave signals.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for providing Session Traversal Utilities for Network Address Translation (STUN) services by STUN servers to web applications based on origin insight, comprising:
   receiving, by a STUN server, a STUN message from a web client executing a web application on a client computing device, wherein the STUN message comprises a request for a STUN service of the STUN server and includes as a comprehension-optional attribute of the STUN message an origin identifier for an application server from which the web application executing on the client computing device originates, wherein the origin identifier for the application server comprises a Uniform Resource Locator (URL), a Domain Name System (DNS) name, or an Internet Protocol (IP) address of the application server;
   extracting the origin identifier for the web application from the STUN message, the origin identifier identifying the application server from which the web application originates;
   determining whether to provide the requested STUN service to the web application at the client computing device based on the origin identifier for the application server;
   responsive to a determination that the STUN service should not be provided, one or more of disregarding the STUN message and generating an error message; and
   responsive to a determination that the STUN service should be provided, processing the STUN message.

2. The method of claim 1, wherein the STUN server comprises a Traversals Using Relays around Network Address Translation (TURN) server; and
   wherein the STUN message comprises a TURN message.

3. The method of claim 1, wherein the web client comprises a Web Real-Time Communications (WebRTC) client;
   wherein the web application comprises a WebRTC web application; and
   wherein the application server comprises a server from which the WebRTC client downloaded the WebRTC web.

4. The method of claim 1, wherein extracting the origin identifier for the web application comprises accessing a comprehension-optional attribute of the STUN message in which the origin identifier of the web application is stored.

5. The method of claim 1, wherein determining whether to provide the STUN service based on the origin identifier for the web application comprises comparing the origin identifier for the web application to a whitelist of approved origins, a blacklist of disapproved origins, or a combination thereof, specified by an enterprise policy.

6. A system for providing Session Traversal Utilities for Network Address Translation (STUN) services by STUN servers to web applications based on origin insight, comprising:
   at least one communications interface;
   a STUN server associated with the at least one communications interface, the STUN server configured to:
   receive a STUN message from a web client executing a web application on a client computing device, wherein the STUN message comprises a request for a STUN service of the STUN server and includes as a comprehension-optional attribute of the STUN message an origin identifier for an application server from which the web application executing on the client computing device originates, wherein the origin identifier for the application server comprises a Uniform Resource Locator (URL), a Domain Name System (DNS) name, or an Internet Protocol (IP) address of the application server;
   extract the origin identifier for the web application identifying the application server from which the web application originates, from the STUN message;
   determine whether to provide the requested STUN service to the web application at the client computing device based on the origin identifier for the application server;
   responsive to a determination that the STUN service should not be provided, one or more of disregard the STUN message and generate an error message; and
   responsive to a determination that the STUN service should be provided, process the STUN message.

7. The system of claim 6, wherein the STUN server is configured to extract the origin identifier for the web application by accessing a comprehension-optional attribute of the STUN message in which the origin identifier of the web application is stored.

8. The system of claim 6, wherein the STUN server is configured to determine whether to provide the STUN service based on the origin identifier for the web application by comparing the origin identifier for the web application to a whitelist of approved origins, a blacklist of disapproved origins, or a combination thereof, specified by an enterprise policy.

9. A non-transitory computer-readable medium having stored thereon computer-executable instructions to cause a processor to implement a method for providing Session Traversal Utilities for Network Address Translation (STUN) services by STUN servers to web applications servers based on origin insight, comprising:
   receiving a STUN message at a STUN server from a web client executing a web application on a client computing device, wherein the STUN message comprises a request for a STUN service of the STUN server and includes as a comprehension-optional attribute of the STUN message an origin identifier for an application server from which the web application executing on the client computing device originates, wherein the origin identifier for the application server comprises a Uniform Resource Locator (URL), a Domain Name System (DNS) name, or an Internet Protocol (IP) address of the application server;
   extracting an origin identifier for a web application from the STUN message, the origin identifier identifying the application server from which the web application originates;
   determining whether to provide the requested STUN service to the web application at the client computing device based on the origin identifier for the application server;
   responsive to a determination that the STUN service should not be provided, one or more of disregarding the STUN message and generating an error message; and responsive to a determination that the STUN service should be provided, processing the STUN message.

10. The non-transitory computer-readable medium of claim 9 having stored thereon the computer-executable instructions to cause the processor to implement the method, wherein extracting the origin identifier for the web application comprises accessing a comprehension-optional attribute of the STUN message in which the origin identifier of the web application is stored.

11. The non-transitory computer-readable medium of claim 9 having stored thereon the computer-executable instructions to cause the processor to implement the method, wherein determining whether to provide the STUN service based on the origin identifier for the web application comprises comparing the origin identifier for the web application to a whitelist of approved origins, a blacklist of disapproved origins, or a combination thereof, specified by an enterprise policy.

12. The method of claim 1, wherein responsive to a determination that the STUN service should not be provided, one or more of disregarding the STUN message and generating an error message comprises both disregarding the STUN message and generating an error message.

13. The system of claim 6, wherein responsive to a determination that the STUN service should not be provided, one or more of disregarding the STUN message and generating an error message comprises both disregarding the STUN message and generating an error message.

14. The non-transitory computer-readable medium of claim 9, wherein responsive to a determination that the STUN service should not be provided, one or more of disregarding the STUN message and generating an error message comprises both disregarding the STUN message and generating an error message.

* * * * *